United States Patent
Bonanno

(10) Patent No.: US 11,384,859 B2
(45) Date of Patent: Jul. 12, 2022

(54) VALVE

(71) Applicant: Vitesco Technologies GmbH, Hannover (DE)

(72) Inventor: Rosario Bonanno, Schwalbach (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/954,646

(22) PCT Filed: Dec. 13, 2018

(86) PCT No.: PCT/EP2018/084717
§ 371 (c)(1),
(2) Date: Jun. 17, 2020

(87) PCT Pub. No.: WO2019/121306
PCT Pub. Date: Jun. 27, 2019

(65) Prior Publication Data
US 2020/0340597 A1   Oct. 29, 2020

(30) Foreign Application Priority Data

Dec. 18, 2017   (DE) .................... 10 2017 223 026.6

(51) Int. Cl.
*F16K 31/06*   (2006.01)
*F16K 1/46*   (2006.01)
(Continued)

(52) U.S. Cl.
CPC ............ *F16K 31/0655* (2013.01); *F16K 1/46* (2013.01); *F02B 37/186* (2013.01); *F16K 27/029* (2013.01)

(58) Field of Classification Search
CPC ...... F16K 1/46; F16K 27/029; F16K 31/0655; F02B 37/186
See application file for complete search history.

(56) References Cited

U.S. PATENT DOCUMENTS 2,886,283 A * 5/1959 Natho .................. F16K 39/022
251/175
5,474,107 A    12/1995 Hayes
(Continued)

FOREIGN PATENT DOCUMENTS

CN           1928402       3/2007
CN          102705519     10/2012
(Continued)

OTHER PUBLICATIONS

Office Action for the corresponding German Patent Application No. 10 2017 223 026.6.
(Continued)

*Primary Examiner* — Eric Keasel
(74) *Attorney, Agent, or Firm* — Cozen O'Connor

(57) ABSTRACT

A valve including a housing, a solenoid arranged in the housing, a pin that can be moved by the solenoid, a cup-shaped piston connected to the pin, a seal arranged in the base region of the piston and interacts with a valve seat, and a seal arranged in the region of the open end of the piston and seals the piston from the housing. The seal interacting with the valve seat has an outer diameter which approximately corresponds to an outer diameter of the seal at the open end of the piston.

15 Claims, 2 Drawing Sheets

(51) Int. Cl.
*F02B 37/18* (2006.01)
*F16K 27/02* (2006.01)

(56) References Cited

U.S. PATENT DOCUMENTS

| | | | | |
|---|---|---|---|---|
| 8,746,657 B2 * | 6/2014 | Sauer | ............... | F16J 15/062 |
| | | | | 251/332 |
| 8,783,653 B2 * | 7/2014 | Jamison | ............ | F16K 31/0658 |
| | | | | 251/129.18 |
| 10,260,644 B2 * | 4/2019 | Bonanno | ............ | F16K 31/0655 |

FOREIGN PATENT DOCUMENTS

| | | | | |
|---|---|---|---|---|
| CN | 107237917 | 10/2017 | | |
| DE | 102004044439 | 4/2006 | | |
| DE | 102007002432 | 6/2008 | | |
| DE | 102008031738 | 1/2010 | | |
| DE | 102016118341 | 3/2018 | | |
| DE | 102017202511 | 6/2018 | | |
| EP | 1717501 | 11/2006 | | |
| GB | 955263 | 4/1964 | | |
| JP | 2014152885 | 8/2014 | | |
| WO | WO 2014068765 | 5/2014 | | |
| WO | WO-2016102242 A1 * | 6/2016 | ......... | F16K 31/0672 |
| WO | WO 2017141606 | 8/2017 | | |

OTHER PUBLICATIONS

Office Action dated Jul. 2, 2021 issued in Chinese Patent Application No. 201880077119.5.

\* cited by examiner

VALVE

CROSS REFERENCE TO RELATED APPLICATIONS

This is a U.S. national stage of Application No. PCT/EP2018/084717 filed Dec. 13, 2018. Priority is claimed on German Application No. DE 10 2017 223 026.6 filed Dec. 18, 2017 the content of which is incorporated herein by reference.

BACKGROUND OF THE INVENTION

1. Field of the Invention

The invention relates to a valve comprising a housing, a solenoid arranged in the housing, a pin movable by the solenoid, a cup-shaped piston connected to the pin, a seal arranged in the base region of the piston and interacts with a valve seat, and a seal arranged in the region of the open end of the piston and seals the piston from the housing.

2. Description of Related Art

Such valves are used, inter alia, as recirculation dump valves on turbochargers in motor vehicles in order to open up a bypass to the suction side in overrun operation. To prevent excessive deceleration of the turbocharger, but also to ensure a fast start-up, rapid opening and closing of the valve are essential prerequisites. In particular during the closing process, immediate closure as a result of the abutment of the piston against a valve seat is of importance. The valve seat is formed by the housing of the turbocharger, on which the valve is flange-mounted. In addition, the axially displaceable piston must be sealed against the housing. Here, it is known to provide a seal on the piston, wherein the seal covers an entire outside so that both sealing tasks are performed by one seal. The seal has a relatively large sealing lip at the open end of the piston. The size of the sealing lip is necessary since, during opening and closing of the valve, the piston is moved relative to the valve and the seal must be guaranteed both in the rest state and during the piston movement. Therefore the seal has a larger diameter at the open end than in the base region of the piston, whereby the projected areas are unequal. Consequently, an additional resulting force acts in the closing direction and holds the piston in the closed position. The disadvantage here is that on opening of the valve, the solenoid must produce a correspondingly large magnetic force in order also to overcome the resulting force. Accordingly, such a valve needs a large solenoid, which must be energized with a corresponding current.

SUMMARY OF THE INVENTION

One aspect of the invention is valve that requires a lower current consumption for opening and closing.

The seal interacting with the valve seat has an outer diameter that corresponds approximately to the outer diameter of the seal at the open end of the piston. This design according to one aspect of the invention achieves that the projected areas of the two seals are approximately equal in size. When the piston is pressurized, a resulting force is thus created which is approximately nil or differs slightly from nil. A force differing from nil is so low that it is negligible for the design of the solenoid, in particular the coil and the power supply. The advantage is that the coil may thus be dimensioned smaller. The valve according to one aspect of the invention therefore requires less installation space and has a significantly lower weight. The associated lower power requirement reduces the load on the on-board network and leads to lower fuel consumption.

If the two outer diameters of the seals are precisely the same, the resulting force is equal to nil. This however imposes high requirements in production in order to keep the production-related tolerances correspondingly small. Such a high and hence costly production complexity can be avoided if, according to an advantageous embodiment, the dimensions of the two outer diameters differ slightly, preferably by maximum 5% and in particular maximum 3%. The resulting force thus created is negligible with respect to the magnetic force of the solenoid.

Also, a further advantage has been found if the seal in the base region has a smaller outer diameter than the seal at the open end. Since in mounted state, the sealing lip of the seal at the open end of the piston lies on the valve housing, its outer diameter in the installation position is already reduced and now approaches the outer diameter of the seal in the base region of the piston due to installation.

Good resistance to media by the seal is ensured by the use of rubber, preferably a fluoro rubber, as a seal material. Another advantage is that a rubber seal of this kind is temperature-resistant up to 180° C.

A reliable connection of the seals to the carrier material is advantageously achieved if the rubber for the two seals is vulcanized on.

In a further embodiment, a seal at the open end of the piston with high long-term stability is achieved if this seal has a base body that adjoins a radially circumferential sealing lip in the direction of the piston base. The base body forms a good basis for the connection of the sealing lip, which guarantees the function suitability over the service life of the valve.

In a further advantageous embodiment, for improved connection of the seal to the piston with long-term stability, the latter has a radially circumferential bead at the open end in the region of the base body of the seal.

The seal interacting with the valve seat advantageously has a sealing lip. Since this is only in contact with another component in the closed state, the pressure conditions on movement of the piston may deform the sealing lip, leading to a new resulting force. According to a particularly advantageous embodiment, such conditions are avoided if a metallic disc is connected to the piston in the base region thereof, and the seal interacting with the valve seat is arranged at least on the outer periphery of the disc. The advantage of the metallic disc is that it significantly improves the dimensional stability of the seal.

Deformation of the seal because of changing pressures can reliably be avoided if the seal has approximately the same layer thickness at every point of the disc.

For reliable sealing of the seal against the valve seat, it has proved advantageous if the radially outer edge of the disc is oriented in the direction of the valve seat.

In a further embodiment, the metallic disc can be connected to the piston particularly simply and securely if it is welded or soldered thereto.

In another advantageous embodiment, a reliable connection of the metallic disc to the piston is achieved in that it is connected to the piston by a catch and push-fit type connection or a press-fit connection. In a further embodiment, the press-fit connection may be achieved if the disc and piston are pressed together by the metal pin.

Both the base region of the piston and the disc have cutouts that allow pressure compensation between the interior of the valve and the lines. It has proved advantageous here to seal the disc against the piston. This is achieved in a simple fashion if the seal extends radially inward from the radially outer edge of the disc far enough for the seal to seal between the disc and the piston. This embodiment also reliably avoids the disadvantages of the relative movements between piston and disc.

A greater resistance to aggressive media and hence a longer service life are achieved if the piston is made from stainless steel, preferably a chromium-nickel steel. A metal piston also has the advantage of greater temperature resistance so that a valve according to one aspect of the invention may cover a wider field of use, in particular with high temperatures.

Owing to the greater stability of metal in relation to plastic, the wall thickness of the piston can be made significantly smaller. Depending on the field of use, it has proven to be advantageous if the metal of the piston has a thickness of 0.3 mm to 1 mm, preferably of 0.4 mm to 0.8 mm and in particular of 0.5 mm.

According to another advantageous embodiment, the piston can be produced at a particularly low cost in a single work step if the piston or disc is a deep-drawn part.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
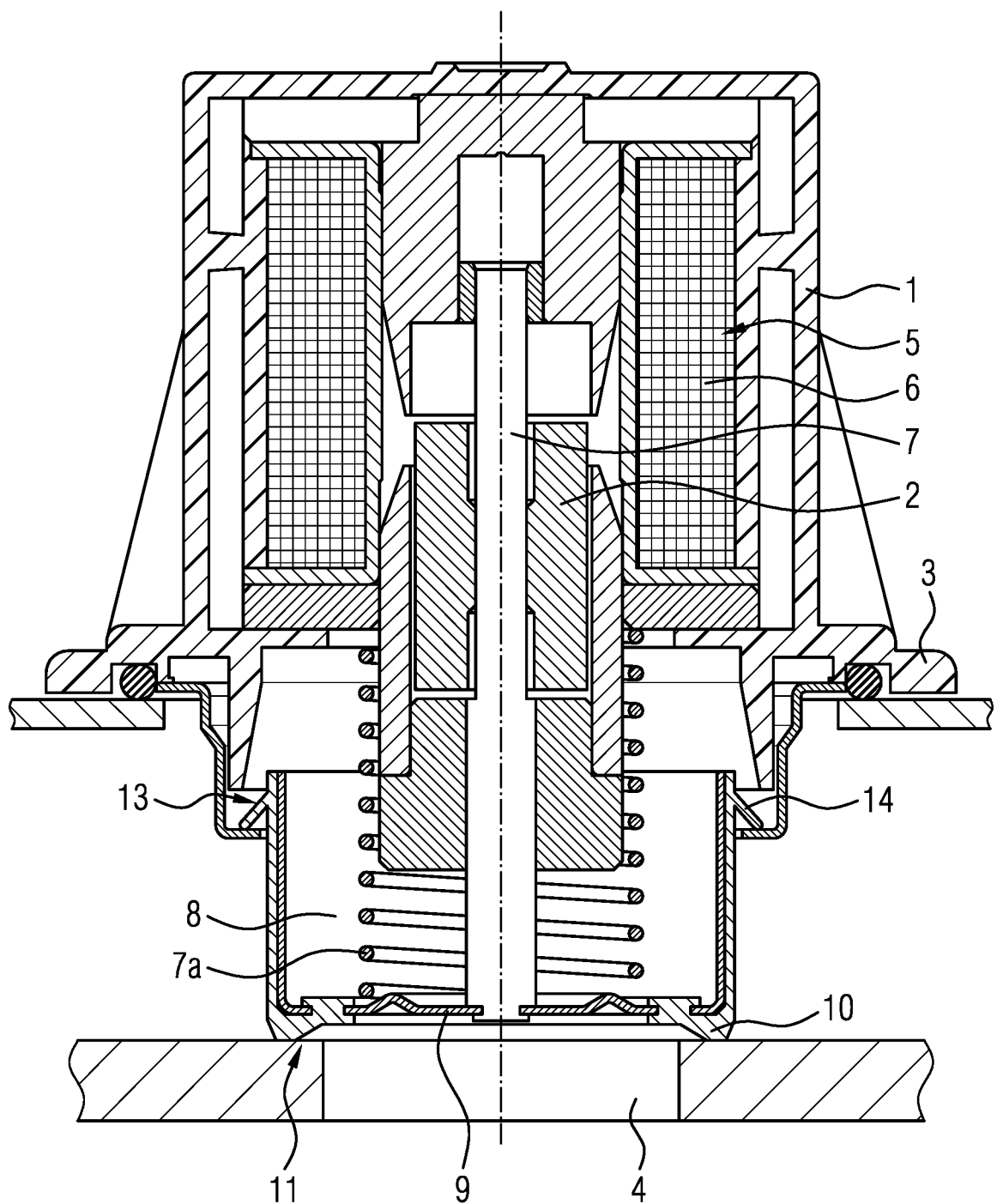
FIG. 1 is a sectional illustration of a valve according to the prior art.

FIG. 1 shows the valve, which comprises a housing 1. The housing 1 furthermore has an integrally formed flange 3, via which the housing 1 is flanged-mounted on a turbocharger (not illustrated) in the region of the bypass line 4. A solenoid 5 having a coil 6 and a metal pin 7 is arranged in the housing 1. The metal pin 7 is connected to a cup-shaped piston 8 that has a seal 10 at the periphery of its base 9. In the closed position shown, the seal 10 bears against the valve seat 11 to close off the bypass line 4 so that no medium can flow from the line 4 into the line 12. Here, a spring 7a pushes the piston 8 in the direction of the valve seat 11. A further seal 13 with a sealing lip 14 is arranged at the open end of the piston 8. If the solenoid 5 is electrically energized, a magnetic force acts on the armature 2, whereby the piston 8 is moved in the direction of the housing 1. Here, the sealing lip 14 seals off the piston 8 against the housing 1.

Figure 2:
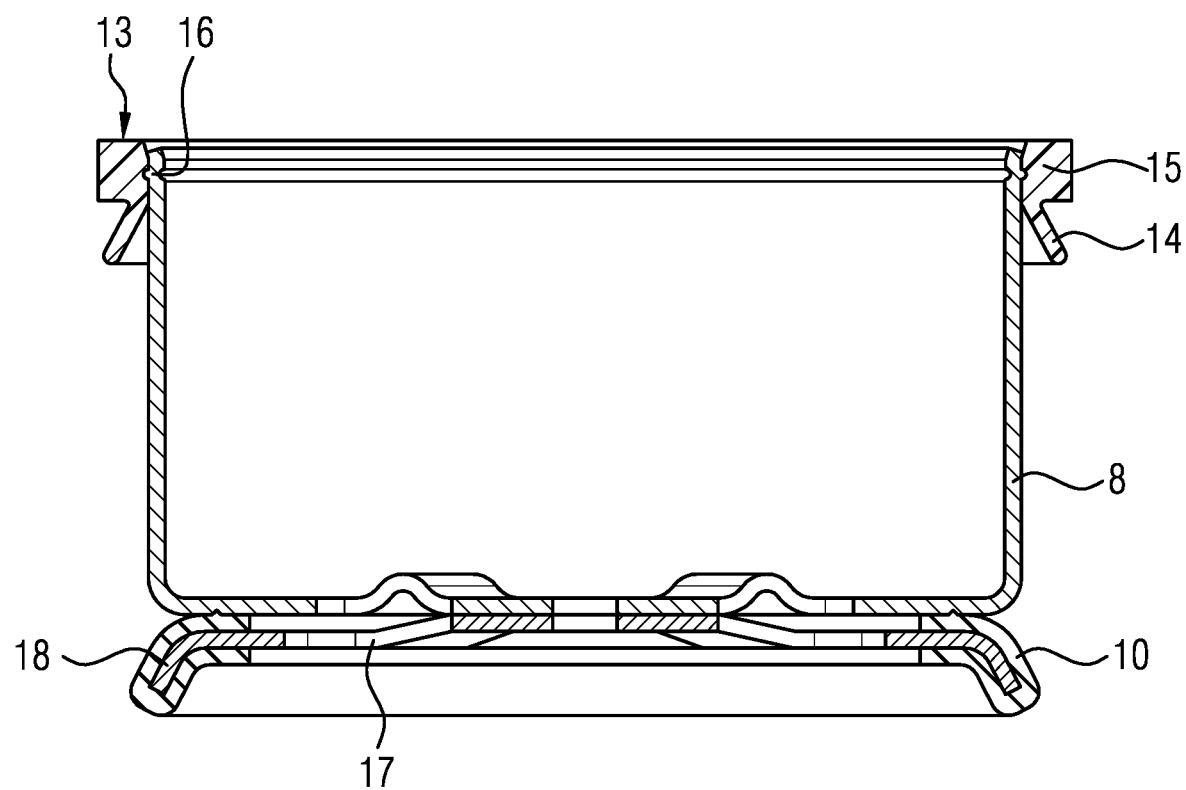
FIG. 2 shows an enlarged sectional illustration of a piston of the valve according to the invention.

In FIG. 2, the piston 8 according to one aspect of the invention also has a seal 13 at the open end of the piston 8, and a seal 10 in the base region of the piston 8. The seal 13 has a base body 15, from which the sealing lip 14 extends in the direction of the piston base. To improve the connection between the seal 13 and the piston 8, the latter has a radially circumferential bead 16 in the region of the base body 15.

As shown in FIG. 2, in the base region of the piston 8, the latter is welded to a punched part in the form of a metallic disc 17, wherein the weld connection is arranged in a centre of the base. The radially outer edge 18 of the disc 17 is oriented in the direction of the valve seat. The seal 10 is vulcanized onto the radially outer edge 18. It extends radially inwardly from the radially outer edge 18 far enough for the disc 17 to seal against the piston 8. Viewed radially, this seal is achieved in the region of the cylindrical wall of the cup-shaped piston 8. The seal 10 here has approximately the same layer thickness at every point of the disc 17. The outer diameter of the seal 10 is only slightly smaller than the outer diameter of the seal 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing;
a valve seat;
a solenoid arranged in the housing;
a pin configured to be moved by the solenoid;
a cup-shaped piston connected to the pin;
a first seal arranged in a base region of the cup-shaped piston and configured to axially interact with the valve seat; and
a second seal arranged in a region of an open end of the cup-shaped piston and configured to seal the cup-shaped piston from the housing having a first portion and a second portion,
wherein the first portion extends radially from the region of the open end of the cup-shaped piston and the second portion extends frustoconically at an acute angle away from an axis of the cup shaped piston from a radially inner portion of first portion towards the base region of the cup-shaped piston,
wherein the first seal interacting with the valve seat has a first outer diameter which corresponds to a second outer diameter of the second seal at the open end of the cup-shaped piston.

2. The valve as claimed in claim 1, wherein the first outer diameter and the second outer diameter differ by a maximum of 5%.

3. The valve as claimed in claim 1, wherein the first seal and the second seal are composed of a rubber.

4. The valve as claimed in claim 3, wherein the rubber for the first seal and the second seal is vulcanized on.

5. The valve as claimed in claim 3, wherein the first seal and the second seal are composed of a rubber.

6. The valve as claimed in claim 5, wherein the rubber is a fluoro rubber.

7. The valve as claimed in claim 1, wherein at the second seal at the open end of the cup-shaped piston has a base body that adjoins a radially circumferential sealing lip in a direction of the base region of the cup-shaped piston.

8. The valve as claimed in claim 7, wherein the cup-shaped piston has a radially circumferential bead in a region of the base body of the second seal.

9. The valve as claimed in claim 1, further comprising:
a metallic disc connected to the cup-shaped piston in the base region of the cup-shaped piston,
wherein the first seal interacting with the valve seat is arranged at least on an outer periphery of the disc.

10. The valve as claimed in claim 9, wherein a radially outer edge of the disc is oriented in a direction of the valve seat.

11. The valve as claimed in claim 9, wherein the metallic disc is welded or soldered to the cup-shaped piston.

12. The valve as claimed in claim 9, wherein the metallic disc is connected to the cup-shaped piston by a catch and push-fit type connection or a press-fit connection.

13. The valve as claimed in claim 1, wherein the first seal extends axially along a cylindrical portion of the cup-shaped piston.

14. The valve as claimed in claim 1, wherein the second seal is configured to contact a radially inner surface of the housing when the first seal is not in contact with the valve seat.

15. A valve, comprising:
a housing;
a valve seat;
a solenoid arranged in the housing;
a pin configured to be moved by the solenoid;
a cup-shaped piston connected to the pin;
a first seal arranged in a base region of the cup-shaped piston and configured to interact with the valve seat; and
a second seal arranged in a region of an open end of the cup-shaped piston and configured to seal the cup-shaped piston from the housing, wherein the,
wherein the first seal interacting with the valve seat has a first outer diameter which corresponds to a second outer diameter of the second seal at the open end of the cup-shaped piston,
a metallic disc connected to the cup-shaped piston in the base region of the cup-shaped piston,
wherein the first seal interacting with the valve seat is arranged at least on an outer periphery of the disc,
wherein a radially outer edge of the disc is oriented in a direction of the valve seat,
wherein the first seal extends radially inward from the radially outer edge of the disc far enough for the first seal to seal between the disc and the cup-shaped piston.

* * * * *